June 21, 1938.   L. A. LAYNE   2,120,983
STRAINER FOR WELLS
Filed Sept. 25, 1936    2 Sheets-Sheet 1

INVENTOR
LESLIE A. LAYNE
BY Jesse R. Stone
Lester B. Clark
ATTORNEYS.

June 21, 1938.  L. A. LAYNE  2,120,983
STRAINER FOR WELLS
Filed Sept. 25, 1936  2 Sheets-Sheet 2

INVENTOR
LESLIE A. LAYNE
BY Jesse R. Stone
Lister B Clark
ATTORNEYS.

Patented June 21, 1938

2,120,983

UNITED STATES PATENT OFFICE 2,120,983

STRAINER FOR WELLS

Leslie A. Layne, Houston, Tex.

Application September 25, 1936, Serial No. 102,501

4 Claims. (Cl. 166—8)

The invention relates to a means and method of controlling an inlet flow of fluid through the strainer in wells in order to extend the productive period of both the strainer and the well.

In the production of fluids from wells, and particularly of oil and gas which are generally located in a porous or granular formation, it is the practice to provide a strainer or screen in order to hold back the granular formation. Such strainers are usually made to a particular gauge or size opening slightly less than the size of the sand or grains in which the desired fluid is found so that the fluid could drain into the well through the strainer and the major portion of the granular material excluded from the well. In the production of oil and gas and particularly where large volumes of fluid pass through the screen or where high pressure existed it has not been uncommon for the abrasive effect of the smaller particles of sand passing through the strainer to quickly destroy the gauge or size opening of the strainer, so that it no longer excluded the size of grains which it had been designed to exclude with the result that the well soon became clogged or sanded with sediment.

The present invention concerns itself with providing a screen or strainer wherein the volume of flow is controlled by one set of openings or orifices and the gauge of the screen or strainer which determines the size of the grains which may or may not pass through the strainer will be controlled by another set of openings or orifices. This arrangement permits the rate of flow through the openings which form the gauge of the strainer to be controlled to such a rate of flow as will prevent abrasion and wearing away of the gauge of the strainer by controlling the rate of flow at the volume orifices.

It is one of the objects of the invention to provide a strainer or screen for wells wherein two sets of independent openings are provided, one to control the volume of flow, and the other to exclude undesirable materials of greater than a predetermined size.

Another object of the invention is to provide a means and method of controlling the flow through strainers so as to accumulate a filter bed of the desired materials in the formation about the strainer.

Another object of the invention is to provide a strainer made up of a frame and strainer area wherein the controlled pressure is applied to the strainer frame.

Another object of the invention is to maintain the gauge of a strainer in a well bore by controlling the velocity flow therethrough.

Another object of the invention is to provide a strainer which is so constructed and arranged that the velocity of flow therethrough will be constant.

Another object of the invention is to provide a strainer which is so constructed and arranged that the velocity of flow will be increased as it progresses through the strainer.

Another object of the invention is to provide a strainer arrangement wherein there is a frame and strainer portion wherein the strainer area is so designed relative to the openings through the frame that the area of any opening in the frame is slightly less than the area of the strainer portion, which is tributary thereto.

Another object is to equalize the flow of liquid through the gauge opening by removing the control of the volume flow therefrom.

Another object of the invention is to prevent the clogging of a strainer screen by providing the greatest velocity of flow in the inside thereof.

Another object of the invention is to reduce the rate of flow at the gauge area of a strainer so that there will be a deposit of granular material about the opening to form a filter bed.

Another object of the invention is to provide a control orifice of such a size as compared to the area which is tributary thereto that the rate of flow through the tributary area can be controlled.

Other and further objects of the invention will be readily apparent when the following description is considered in connection with the accompanying drawings, wherein.

Figures 5, 6, 7, 8:
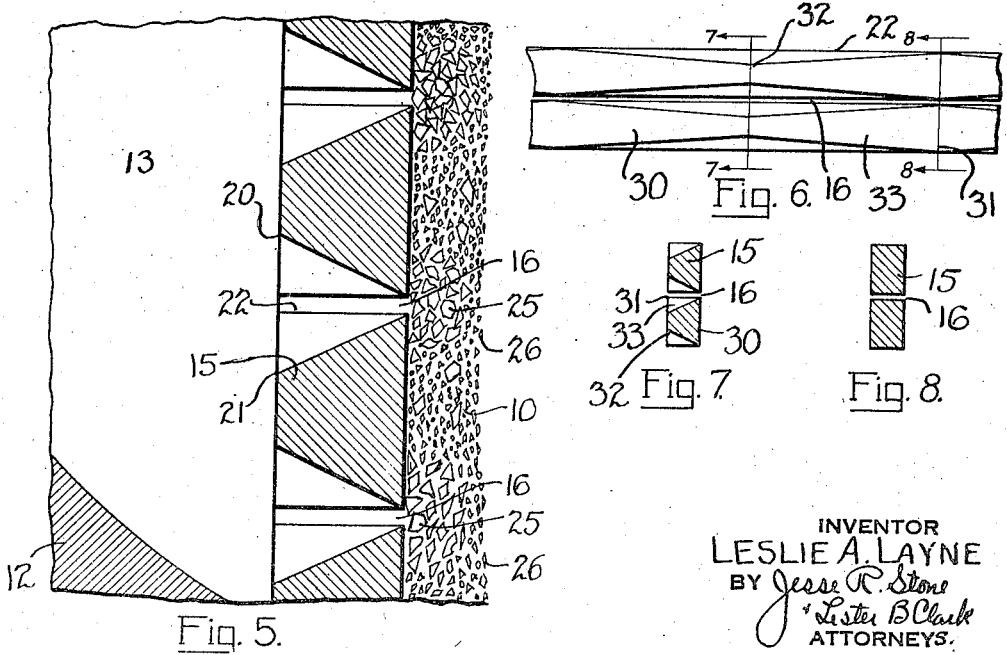
Fig. 5 is a magnified vertical section illustrating the arrangement of openings and the formation of the filter bed.
Fig. 6 shows a side elevation of a particular form of strainer wire used to obtain a constant velocity flow.
Figs. 7 and 8 are sections taken on the lines

7—7 and 8—8, respectively, of Fig. 6 to show the cross-section of the strainer wire.

Figures 1, 2, 9:
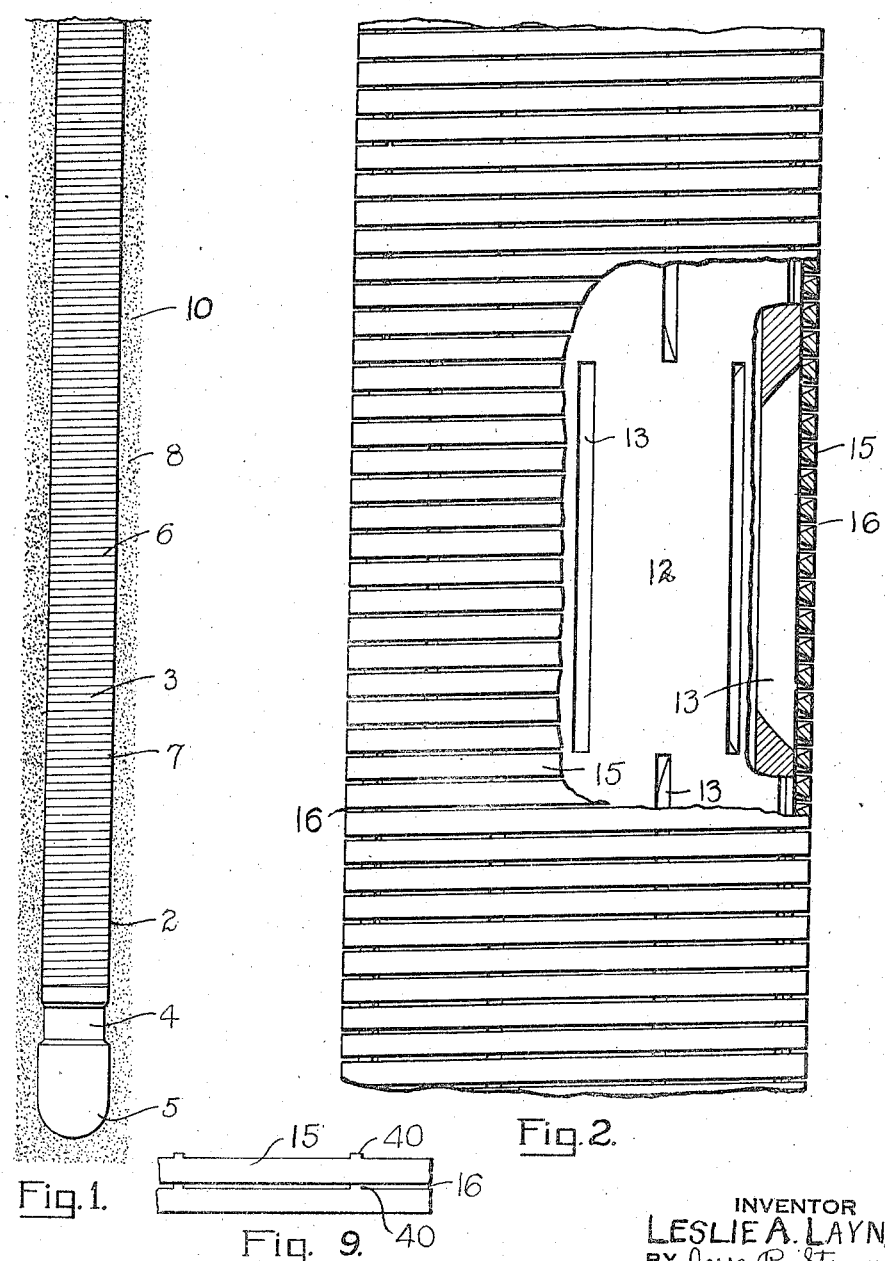
Fig. 1 is a side elevation of a strainer constructed in accordance with the present invention and also the formation arranged thereabout.
Fig. 2 is an enlarged view of a strainer with certain portions broken away to illustrate the construction.

Fig. 9 shows another form of strainer wire which may be used. In Fig. 1 the well bore is indicated generally at 2 and inserted therein is a strainer or screen 3 which is made up of a frame or foundation such as the pipe 4. A guide shoe such as 5 may be provided on the lower end thereof. This strainer is adapted to be lowered into the well bore which has been previously drilled and is provided with a strainer opening 6 which is in the form of a helix, formed by the wrapping of the wire 7 about the pipe 4, the pipe 4 having openings or perforations thereto in order to admit the fluid into the pipe where it can either flow or be pumped to the surface. The porous or granular formation 8 about the strainer gradually moves to the position shown in Fig. 1 where it accumulates about the strainer.

The structure so far described is old and well known in the art and sets forth what is a standard practice in the straining of sand from desired fluids.

The grains of sand 10 which make up the formation 8 are more or less uniform in size in any particular formation, various formations having, of course, different sized grains. It is therefore the practice to determine the size of the grains and to then make the gauge of the openings 6 such that they are slightly smaller than the predominant size of the grain from which the fluid is to be strained. In this manner the major portion of sand is excluded and the fluid and finer particles of sand pass into the screen and out through the well. The entrance of these small particles of sand or gravel which are not excluded by this strainer occurs at a high rate of speed because with the strainers used in the past the gauge opening 6 was also the control opening which determined the rate of flow through the strainer. In other words a single opening was used to control the volume of flow and to also determine the gauge of the strainer.

Necessarily, the size of the opening would become enlarged due to the abrasive action of sand traveling at a high rate of speed and being controlled as to its rate of flow by that same opening. The result of this was the enlargement of the gauge to such an extent that those grains of sand which were intended to be excluded were shortly permitted to enter the strainer with the resultant of clogging the strainer and sanding up of the well, it being understood that it is the present practice to have the opening in the frame or foundation pipe such as 4 of a greater area than the openings about the wrapping of wires such as the opening 6. These openings were merely provided for the entrance of fluid after it had passed the gauge opening 6. The pipe was therefore used for no other purpose than to support the strainer wire.

The present invention contemplates employing this frame for the strainer wire for another purpose; namely, to control the rate of flow through the strainer and by so doing to reduce the rate of flow at the strainer opening where the gauge is to be maintained so that the abrasive action thereon would be materially reduced and any abrasion would occur at the control orifice rather than at the gauge opening. To accomplish this such a strainer is illustrated generally in Fig. 2, but it is to be specifically understood that the arrangement and the construction of the strainer may be varied so long as it embodies the principle of providing a set of control orifices and a set of gauge openings, each of which performs its independent function.

In Fig. 2 a pipe 12 is illustrated as having been provided with a plurality of slots 13. These slots may be of any desired length, width or spacing relative to each other in order to obtain the desired inlet area. Slots have been provided because of the fact that they are of uniform area along the axis of the pipe and in this manner they can be spaced relative to each other so that the area of these openings with respect to the gauge openings between the wires can be controlled.

While a pipe has been shown and is herewith described, it is to be understood that any desired type of frame or support for the strainer wire 15 can be provided. The strainer wire may take any configuration in cross section so long as the gauge of opening 16 between the wires is maintained.

Figure 3:
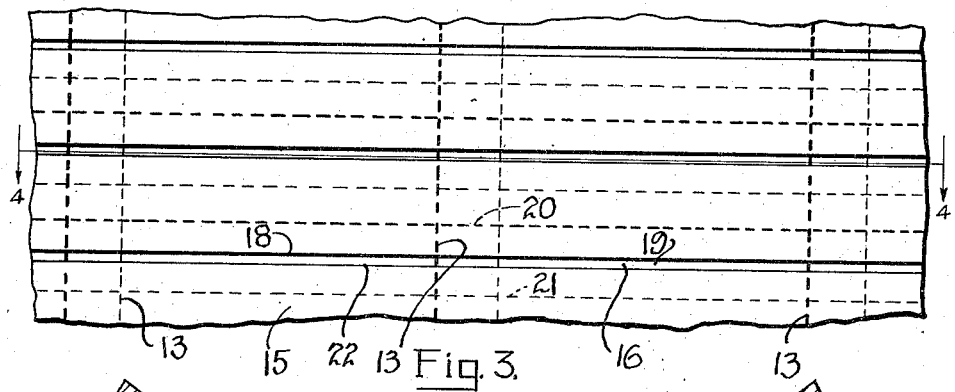
Fig. 3 is a magnified view of a side elevation of the strainer assembly.

In Fig. 3 a broken elevation is shown in which the slot 13 is illustrated beneath the strainer wire 15. A keystone shape wire has been illustrated because this is one of the standard types of wire in general use, but the wire may take different configurations as will be later explained.

In Fig. 3 the gauge opening 16 is shown as passing transversely across the slots 13 and it seems obvious that certain increments of the slot 13 and of the opening 16 will have an associated relationship in that a certain portion of the gauge opening 16 will be tributary to a definite area of the slot 13. In other words, taking the lower opening 16 in Fig. 3 there will be a length of the opening 16 which will extend from a point midway between any two of the slots 13 and which is equal to the distance between center lines of any two adjacent slots.

In Fig. 3 the length of the opening 16 which will be tributary to the center slot 13 is that distance between the points 18 and 19 measuring across the drawings, whereas the vertical length of the slot 13 which will receive the flow from this tributary area will have the length of the slots between the points 20 and 21 measured up and down on Fig. 3 of the drawings.

Figure 4:
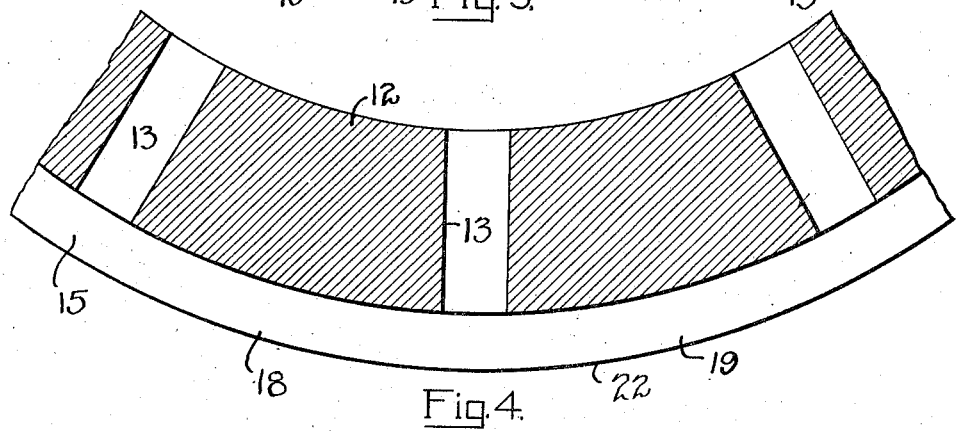
Fig. 4 is a section taken on the line 4—4 of Fig. 3 and looking in the direction of the arrows.

Thus, the size of an increment of the slot which is of an area equal to the width of the slot by the distance between the points 20 and 21 will be made of such a size that it will be slightly less than the area of the opening 16 between the points 18 and 19. In this manner any wear will occur upon the walls of the opening 13, as is seen in Fig. 4, and the wear of the faces 22 of the wire will be materially reduced. This naturally has a tendency to maintain the gauge of the opening 16 for a materially greater length of time because any very slight wear on the opening 16 changes the gauge thereof, whereas the wall of the opening 13 has a substantially greater amount of metal present because of the greater depth of the opening 13, as seen in Fig. 4, when compared with the narrow opening 16 which presents but a very small amount of metal to resist wear.

The foregoing explanation is merely a detailed analysis of the operation of the strainer at any particular increment of some particular slot and a particular portion of the gauge opening which is tributary thereto, but serves to explain that the wear will be taken at such a location that the gauge opening may be maintained for a great period of time because it is subjected to little or no abrasion due to the passing of fine particles of sand.

The arrangement of the pipe and wire is merely illustrative because the invention may be applied to other types of screen.

In Fig. 5 an enlarged sectional view is shown in which the vertical increment of the slot 13 is shown between the points 20 and 21, whereas the transverse increment of the gauge opening 16 is shown between points 18 and 19 in Fig. 4.

In Fig. 5 the formation of the filter bed made up of the gravel 10 has been illustrated, but it will be particularly noted that closely adjacent each of the openings 16 there has been an accumulation of larger particles of sand or gravel such as 25. These larger particles have accumulated because of the fact that the finer particles from among them have passed through the opening 16 in the original washing and development of the well.

The accumulation of these coarser particles which are held out by the gauge of the opening 16 gradually settle together and form an accumulation as seen in Fig. 5 which, because of the reduced velocity of the flow through the opening 16 forms a barrier for the finer particles of sand such as 26 so that a filter bed having a gradual gradation of particles will occur. After this filter bed has once been formed there will be little or no flow of abrasive through the opening 16 and then when wear does occur on the opening 16 there will have been a filter bed formed as to prevent the inflow of the finer particles. On the other hand, if, during the initial flow, the opening 16 had been subjected to wear then the larger particles such as 25 would have entered the strainer and the gauge of the strainer would have been so much enlarged that it would not restrain the size of grain which it had been designed to exclude. It seems obvious therefore that a method of forming a filter bed has been provided by controlling the flow of fluid at the gauge opening until such time as the filter bed has been formed and that this is accomplished by utilizing a separate control orifice such as the orifice 13 in the frame or body of the strainer.

In some instances it may be desirable to have a uniform rate of flow of fluid from the gauge opening 16 in between the adjacent wrappings of wire as well as through the control orifice 13. If this is desired a special type of wire may be provided such as seen in Figs. 6 and 7. Fig. 6 is a back side view of the wire and showing the face 22 which controls the gauge on the far side, whereas the inside shoulder and face of the wire 30, instead of being of a uniform width, gradually varies in width from the maximum at 31 to the minimum shown at 32. The length of this tapered portion which is illustrated generally at 33 will be equal to one-half of the distance between center lines of the slots 13 so that the area 32 of minimum width will be directly over the center line of an orifice 13, whereas the maximum width area at 31 will be over a line midway between the center lines of two adjacent slots 13. The taper of the portion 33 is so designed that it gradually increases in proportion to the inflow from the gauge opening 16 which is of course of uniform width. In this manner all of the fluid will flow at a uniform rate, regardless of which point in the increment in the opening 16 it may make its entry.

In Fig. 8 a wire 15 of uniform cross section has been shown so that a gauge opening 16 of material width is provided. With an opening of this type of course the slot 13 may be varied in order to carry out the function hereinbefore expressed.

Fig. 9 shows a wire 15 having lugs 40 on one side thereof so as to serve as spacers if that type of strainer wire is desired. This forms a definite and independent inlet area for each pipe opening so as to equalize the flow.

The type of strainer here disclosed can be originally made up of a somewhat coarser gauge than ordinary type strainer because sand cutting and wear on the gauge opening is eliminated.

The equalizing of the flow of fluid through the gauge opening also tends to reduce the rate of flow through any particular part of the opening such as directly over the control orifice. This in turn results in the forming of a much better filter bed and an even pull on the formation so that the sand is not jammed against the strainer and the productive life of the well is materially increased.

Broadly, the invention contemplates the control of the volume through an orifice which can be subjected to a material amount of wear and which orifice will in turn control the rate of flow through the gauge opening which serves the purpose of determining the size of particles which may pass therethrough. By designing and proportioning the parts in accordance with the foregoing it seems clear that any particular size of sand may be strained and a proper filter bed formed about the strainer before the gauge of wire is destroyed.

What is claimed is:

1. A strainer including a wire wrapping having a helical strainer area between the wrappings, a support for the wire having drain openings of slotted configuration through which the flow from the strainer area will pass, the size of the exposed portion of each opening in the support between adjacent layers of wire being less than the strainer area which serves as a tributary therefor so that velocity of the fluid at the support will be greater than the velocity of the fluid entering between the wire wrappings.

2. A well strainer including a support, slots therein for the entry of fluid from the well, and a strainer structure in close contact over said support, a plurality of independent strainer areas in said structure, the size of the exposed effective areas of each of said slots being such that they are less than the total area of the independent strainer areas that are tributary thereto.

3. In a well strainer comprising a slotted pipe pipe and wire wrapping thereon, an increment of structure to control and gauge the flow of fluid comprising a control orifice created by the uncovered area of a slot between two adjacent edges of contiguous wrappings of wire, and a gauge opening tributary to said control orifice and of greater area than said orifice which is created by the space between the outer edges of said contiguous wrappings of wire and of a length equal to the distance between centers of two adjacent slots.

4. A well strainer comprising a pipe, vertically disposed slots in said pipe, said slots being uniformly distributed in a predetermined pattern, a strainer wire wrapped about said pipe, said wire being substantially keystone in cross section with the wider portion outward, the gauge of the strainer being determined by the spacing of the wider edges of the adjacent wrappings of wire, the inside face of the wire being in close contact with the periphery of the pipe and overlying portions of said slots so as to divide each slot into a plurality of vertically spaced effective control areas defined by the width of the slot and the spacing of the inner adjacent edges of the narrower portions of the keystone wire, a strainer area which is tributary to each control area which is formed of a width equal to the gauge of the strainer due to the spacing of the wrappings of wire and of a length between the center lines intermediate to adjacent slots, the strainer area being greater than the control area to which it is tributary so that the control area determines the volume of flow and the strainer area determines the size of foreign matter carried by the fluid being strained which shall not pass so that the rate of flow is controlled by said control area.

LESLIE A. LAYNE.